US009303502B2

(12) United States Patent
Huang et al.

(10) Patent No.: US 9,303,502 B2
(45) Date of Patent: Apr. 5, 2016

(54) METHOD OF CONTROLLING WATER PRODUCTION THROUGH TREATING PARTICLES WITH RPMS

(75) Inventors: Tianping Huang, Spring, TX (US); James B. Crews, Willis, TX (US); John R. Willingham, Cypress, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 762 days.

(21) Appl. No.: 12/606,464

(22) Filed: Oct. 27, 2009

(65) Prior Publication Data

US 2011/0098377 A1     Apr. 28, 2011

(51) Int. Cl.

| C09K 8/00 | (2006.01) |
| E21B 33/13 | (2006.01) |
| E21B 43/32 | (2006.01) |
| C04B 20/10 | (2006.01) |
| C09K 8/508 | (2006.01) |
| C09K 8/516 | (2006.01) |
| C09K 8/80 | (2006.01) |
| E21B 43/267 | (2006.01) |
| C04B 103/00 | (2006.01) |

(52) U.S. Cl.
CPC .............. *E21B 43/32* (2013.01); *C04B 20/1033* (2013.01); *C09K 8/508* (2013.01); *C09K 8/516* (2013.01); *C09K 8/805* (2013.01); *E21B 43/267* (2013.01); *C04B 2103/0049* (2013.01)

(58) Field of Classification Search
CPC ............... C04B 20/1033; C04B 14/06; C04B 2103/0049; C09K 8/508; C09K 8/516; C09K 8/805; E21B 43/267; E21B 43/32
USPC ........................................................ 523/130
See application file for complete search history.

(56) References Cited

U.S. PATENT DOCUMENTS

| 3,353,601 | A | * | 11/1967 | Dollarhide et al. ........... 166/283 |
| 4,532,052 | A | * | 7/1985 | Weaver et al. ................ 507/222 |
| 5,181,568 | A | * | 1/1993 | McKown et al. ............. 166/293 |
| 5,735,349 | A | | 4/1998 | Dawson et al. |
| 6,109,350 | A | | 8/2000 | Nguyen et al. |
| 6,228,812 | B1 | | 5/2001 | Dawson et al. |
| 7,008,908 | B2 | | 3/2006 | Chan et al. |
| 7,207,386 | B2 | | 4/2007 | Brannon et al. |
| 7,223,827 | B1 | | 5/2007 | Miller |
| 7,398,825 | B2 | | 7/2008 | Nguyen et al. |

(Continued)

FOREIGN PATENT DOCUMENTS

EP        0933414 A1    8/1999

OTHER PUBLICATIONS

E.D. Darlymple, et al., "Results of Using a Relative-Permeability Modifier With a Fracture-Stimulation Treatment," SPE 49043, Sep. 27-30, 1998, 1998 SPE Technical Conference Exhibition, New Orleans, LA., pp. 285-291.

(Continued)

*Primary Examiner* — David Karst
(74) *Attorney, Agent, or Firm* — Mossman Kumar & Tyler PC

(57) ABSTRACT

Water production from a subterranean formation is inhibited or controlled by pumping a fluid containing coated particles through a wellbore into the formation. The particles have been previously coated with a relative permeability modifier (RPM). Upon contact with water, the RPM coating expands or swells and inhibits and controls the production of water. The RPM may be a water hydrolyzable polymer having a weight average molecular weight greater than 100,000. The particles may be conventional proppants or gravel.

8 Claims, 2 Drawing Sheets

(56) References Cited

U.S. PATENT DOCUMENTS

| | | | |
|---|---|---|---|
| 2004/0177957 A1* | 9/2004 | Kalfayan et al. | 166/270 |
| 2005/0284632 A1 | 12/2005 | Dalrymple et al. | |
| 2006/0065396 A1* | 3/2006 | Dawson et al. | 166/279 |
| 2007/0012445 A1 | 1/2007 | Nguyen et al. | |
| 2007/0029087 A1 | 2/2007 | Nguyen et al. | |
| 2008/0017376 A1* | 1/2008 | Badalamenti et al. | 166/292 |
| 2008/0099203 A1 | 5/2008 | Mueller et al. | |
| 2008/0108524 A1* | 5/2008 | Willberg et al. | 507/225 |
| 2008/0142222 A1 | 6/2008 | Howard et al. | |
| 2008/0154224 A1* | 6/2008 | Daniel et al. | 604/367 |
| 2009/0095484 A1 | 4/2009 | Huang et al. | |

OTHER PUBLICATIONS

C. Wouter Botermans et al., "Relative Permeability Modifiers: Myth or Reality?," SPE 68973, May 21-22, 2001, 2001 SPE European Formation Damage Conference, The Hague, Netherlands, pp. 1-13.

E.G. Borodin, et al., "Application of Relative Permeability Modifiers to Control Water Cut Following Hydraulic Fracturing in Western Siberia Oil Fields—Russian Case-History Study," SPE 102679, Sep. 24-27, 2006, 2006 SPE Annual Technical Conference and Exhibition, San Antonio, Texas, pp. 411-418.

Ali A Al-Taq, et al., "Potential Damage Due to Relative Permeability Modifiers: Laboratory Studies and a Case History," SPE 112458, Feb. 13-15, 2008, 2008 SPE International Symposium and Exhibition on Formation Damage Control, Lafayette, LA, pp. 1-17.

Clive Cornwall, et al., "Relative Permeability Modifier (RPM): Suitability Screening With Reservoir Core Under Reservoir Conditions," SPE 112503, Feb. 13-15, 2008, 2008 SPE International Symposium and Exhibition on Formation Damage Control, Lafayette, LA, pp. 1-9.

* cited by examiner

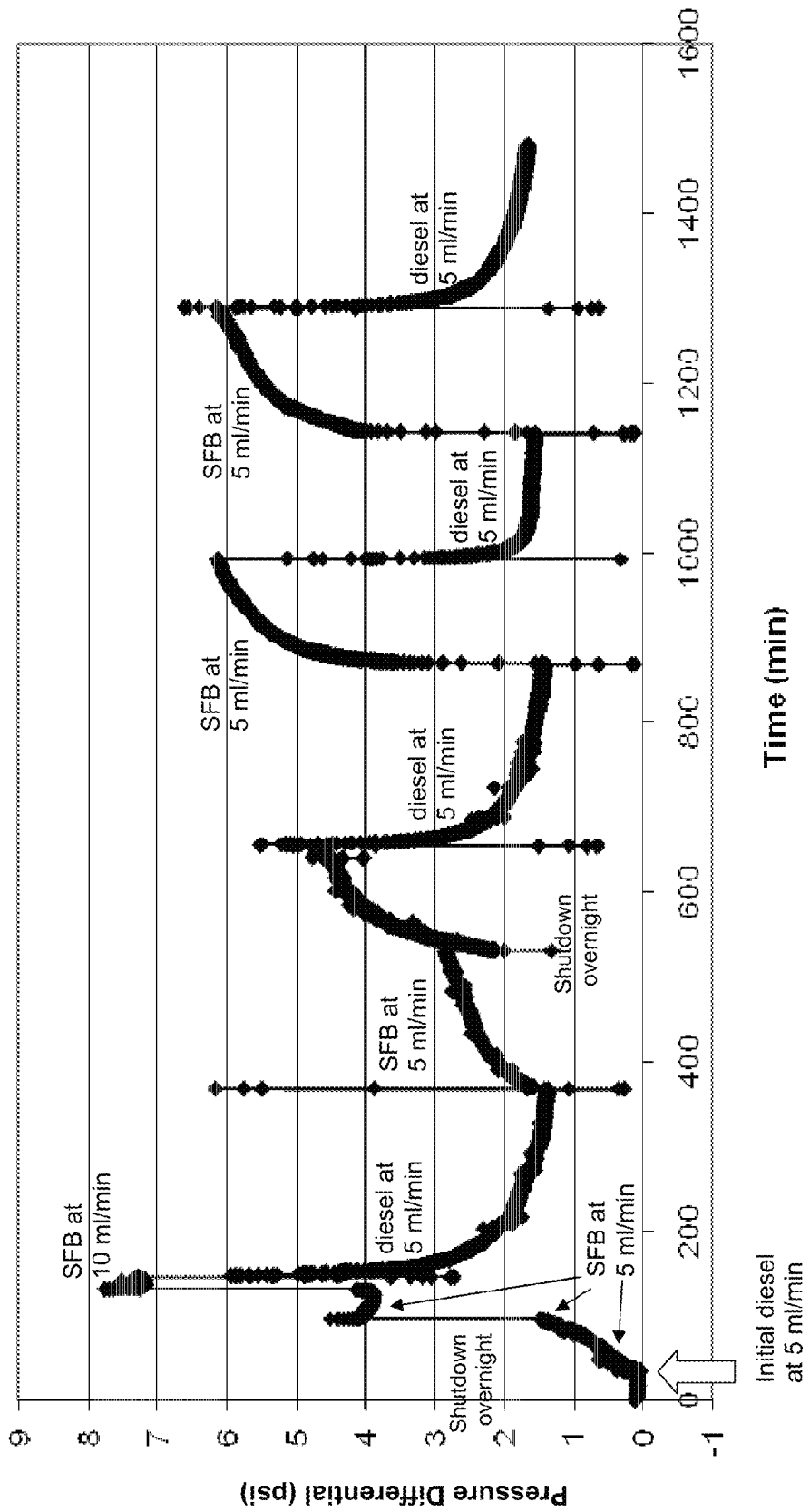

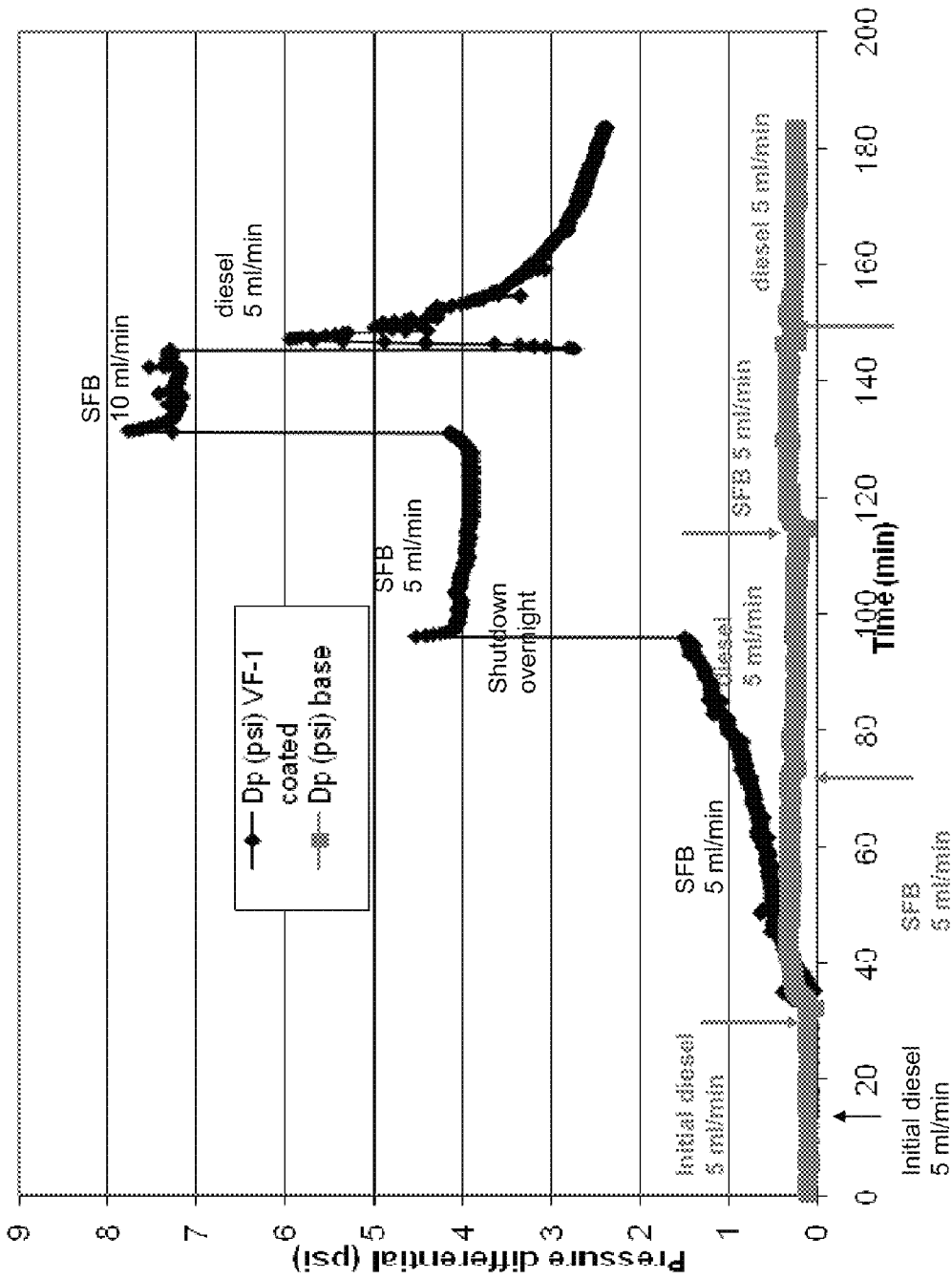

METHOD OF CONTROLLING WATER PRODUCTION THROUGH TREATING PARTICLES WITH RPMS

TECHNICAL FIELD

The present invention relates to methods of inhibiting the production of water from subterranean formations during hydrocarbon recovery operations, and more particularly relates, in one non-limiting embodiment, to substances for and methods of inhibiting and controlling water production using coated proppants.

TECHNICAL BACKGROUND

Unwanted water production is a major problem in maximizing the hydrocarbon production potential of a subterranean well. Tremendous costs may be incurred from separating and disposing of large amounts of produced water, inhibiting the corrosion of tubulars contacted by the water, replacing corroded tubular equipment downhole, and surface equipment maintenance. Shutting off unwanted water production is a necessary condition to maintaining a productive field.

Different methods and materials have been used to treat near-wellbore subterranean formations to selectively control unwanted water production in the oil industry. The goal is to maximize hydrocarbon production while minimizing and controlling the production of water. Pumping or squeezing certain materials, such as relative permeability modifiers (RPMs), into subterranean formations forms a water-blocking matrix within the formation to control the water flow while not affecting the flow of oil and/or gas therefrom. RPMs thus reduce the permeability of water relative to hydrocarbons such as oil and gas.

The permeability adjustment of the formation is sometimes referred to as water flow regulation, or more simply as water regulation. Water control and profile modification have been routinely performed using a variety of polymers, such as polyacrylamide, cellulose and xanthan gum.

The conventional manner of RPM applications for water control involves pumping the RPM into a formation matrix that is a highly heterogeneous porous media. Unfortunately, the RPM is hard to uniformly distribute, and it is easy to inadvertently generate formation damage in the formation matrix in the process.

It would thus be desirable to discover a method which could improve the control of unwanted water production from subsurface formations and improve distribution of the water control agent, while minimizing formation damage.

SUMMARY

There is provided in one non-limiting embodiment a method of controlling water production from a subterranean formation that concerns introducing particles coated with a relative permeability modifier (RPM) into a subterranean formation through a wellbore. The method further involves contacting the coated particles with water, causing swelling of the RPM thereby inhibiting water flow.

There is additionally provided in one non-restrictive version, a method of controlling water production from a subterranean formation where the method involves coating a particle (e.g. gravel or proppant) with a relative permeability modifier (RPM) and then mixing the coated particle with a carrier fluid. The coated particle and carrier fluid are introduced into a subterranean formation through a wellbore adjacent the subterranean formation, and the coated particle or proppant is placed in the subterranean formation. The coated particle is then contacted with water, such as water from the formation, which causes the RPM coated on the particle to swell thereby inhibiting water flow.

There is also provided, in another non-limiting form, treated particles (e.g. proppants or gravel) which involve a plurality of proppant particles having a relative permeability modifier (RPM) coated thereon.

Alternatively there are provided in one non-restrictive embodiment particles coated with a relative permeability modifier (RPM) which are made by a process involving at least partially hydrolyzing a RPM in a liquid selected from the group consisting of water, brine, glycol, ethanol and mixtures thereof. A plurality of particles are contacted with the liquid containing the RPM. The liquid is at least partially vaporized, thereby leaving a coating of the RPM on the particles.

BRIEF DESCRIPTION OF THE DRAWINGS

FIG. 1 is a graph of the pressure differential of crosslinked VF-1 copolymer coated on 20-60 mesh (850-250 micron) HSP® proppant at 200° F. (93° C.) with diesel and simulated formation brine (SFB); and FIG. 2 is a graph of a comparison of a base proppant pack and a VF-1 copolymer coated proppant pack at 200° F. (93° C.) with diesel and simulated formation brine (SFB).

DETAILED DESCRIPTION

It has been discovered that unwanted subterranean formation water production may be controlled or inhibited by a method involving treating proppants with relative permeability modifiers (RPMs), and incorporating the coated proppants in the fluids used for hydraulic fracturing, frac-packing, and gravel-packing treatments of the formations. The proppants or gravel may be pre-treated or coated with RPMs on the surface before pumping them in a carrier fluid downhole.

Generally, the RPMs are relatively high molecular weight polymers that have components or functional groups that anchor or affiliate or attach onto the surface of the proppant particle. The RPMs also are hydrophilic and/or hydrolyzable meaning they swell or expand upon contact with water. The proppant may be sand, ceramic beads or metal beads. The size of the proppant may range from 10 mesh to about 200 mesh (from about 2000 microns to about 75 microns). The loading of the RPMs may be one pound of RPM per 100 to 5000 pounds of proppant.

The RPM-treated proppant will form proppant fracture beds, proppant packs or gravel packs as special porous media in downhole and near wellbore regions to control unwanted formation water flowing into the wellbore while not adversely affecting the flow of oil and gas. When water flows into the special porous media, the RPM polymers anchored on the proppant expand to reduce the water flow channel and increase the resistance to water flow. When oil and/or gas flow through this special porous media, the RPM polymers shrink to open the flow channel for oil and/or gas flow. The RPM pre-treated proppants are expected to form homogeneous porous media with the RPM uniformly distributed in the downhole and near wellbore region to increase the efficiency of the RPM controlling unwanted water production and to avoid formation damage.

In more detail, suitable RPMs include water hydrolyzable polymers having a weight average molecular weight greater than 100,000. Suitable, more specific examples of RPMs include, but are not necessarily limited to, homopolymers and copolymers of acrylamide, sulfonated or quaternized homopolymers and copolymers of acrylamide, polyvinylalcohols, polysiloxanes, hydrophilic natural gum polymers and chemically modified derivatives thereof. Crosslinked versions of these polymers may also be suitable, including but not necessarily limited to, crosslinked homopolymers and copolymers of acrylamide, crosslinked sulfonated or quaternized homopolymers and copolymers of acrylamide, crosslinked polyvinylalcohols, crosslinked polysiloxanes, crosslinked hydrophilic natural gum polymers and chemically modified derivatives thereof. Further specific examples of suitable RPMs include, but are not necessarily limited to, copolymers having a hydrophilic monomeric unit, where the hydrophilic monomeric unit is selected from the group consisting of ammonium and alkali metal salt of acrylamidomethylpropanesulfonic acid (AMPS), a first anchoring monomeric unit based on N-vinylformamide and a filler monomeric unit, where the filler monomeric unit is selected from the group consisting of acrylamide and methylacrylamide. Additional suitable RPMs include, but are not necessarily limited to, copolymers of vinylamide monomers and monomers containing ammonium or quaternary ammonium moieties, copolymers of vinylamide monomers and monomers comprising vinylcarboxylic acid monomers and/or vinylsulfonic acid monomers, and salts thereof, and these aforementioned copolymers further comprising a crosslinking monomer selected from the group consisting of bis-acrylamide, diallylamine, N,N-diallylacrylamide, divinyloxyethane, divinyldimethylsilane.

More information about RPMs suitable to be of use in the method and compositions described herein may be found in U.S. Pat. Nos. 5,735,349; 6,228,812; 7,008,908; 7,207,386 and 7,398,825, all of which are incorporated by reference herein in their entirety.

With respect to the particles coated by the RPMs as described by the methods herein, otherwise conventional proppants or gravel may be used. Proppants are known in the oilfield as sized particles typically mixed with fracturing fluids to hold open fractures after a hydraulic fracturing treatment. Proppants are sorted for size and sphericity to provide an effective conduit for the production of oil and/or gas from the reservoir to the wellbore. "Gravel" has a particular meaning in the oilfield relating to particles of a specific size or specific size range which are placed between a screen that is positioned in the wellbore and the surrounding annulus. The size of the gravel is selected to prevent the passage of sand from the formation through the gravel pack. A primary objective of the gravel is to stabilize the formation while minimizing inhibition of well productivity.

The particles, e.g. proppants or gravel, may suitably be a variety of materials including, but not necessarily limited to, sand (the most common component of which is silica, i.e. silicon dioxide, $SiO_2$), glass beads, ceramic beads, metal beads, bauxite grains, walnut shell fragments, aluminum pellets, nylon pellets and combinations thereof. The particles may range in size from about 10 mesh to about 200 mesh (from about 2000 microns to about 75 microns).

The particles may be coated by a method that involves at least partially hydrolyzing the RPM in a liquid including, but not necessarily limited to, water, brine, glycol, ethanol and mixtures thereof. The particles are then intimately mixed or contacted with the liquid to contact the surfaces of the particles with the RPM. The liquid is then at least partially vaporized or evaporated through vacuum, or the use of heat and/or contact with a dry gas such as air, nitrogen, oxygen or the like. The coating method may be conducted at a temperature between ambient up to about 200° F. (about 93° C.), to facilitate quick drying of the coating. It may not be necessary in some embodiments to completely dry the coating.

The loading of the RPM on the particles may range from one pound of RPM to about 100 to about 5000 pounds of particle (1 kilogram of RPM to about 100 to about 5000 kilograms of particle). Alternatively, the RPM loading may range from one pound of RPM independently to about 200 pounds to about 1000 pounds of particle, e.g. proppant, where "independently" means any combination of the mentioned lower and upper thresholds.

The fluids into which the coated particles may be placed include, but are not necessarily limited to, water-based, oil-based, foam-based, emulsion-based, solvent-based and liquid gas-based fracturing fluids, frac-pack fluids and gravel-packing fluids. It should be understood that polymer hydrolyzation is a relatively slow process, and although the RPMs swell when contacted with water, the carrier fluid may be water-based. During the pumping period, the RPM coated on the proppants may hydrolyze or swell slightly, but will not interfere with the proppant placement and pumping because of the relatively small amount of RPM loading and the dried or partially dried coating. The RPM coated particles may be added at any suitable selected stage during a treatment and does not have to be added throughout the typical proppant stages, e.g. only in the initial, middle or latter proppant stages. Different sizes and/or different densities of proppants may be RPM-coated, in one non-limiting instance, lightweight (LWPs) and ultra-lightweight proppants (ULWPs) would also be suitable for the methods and compositions described herein. Combinations of these various materials and procedures may be used.

The invention will now be illustrated with respect to certain examples which are not intended to limit the invention in any way but simply to further illustrated it in certain specific embodiments.

Examples

FIG. 1 is a graph of the pressure differential of crosslinked VF-1 copolymer coated on 20-60 mesh (850-250 micron) HSP® proppant at 200° F. (93° C.) with diesel and simulated formation brine (SFB). HSP proppant is available from Carbo Ceramics. VF-1 is a cross-linked vinylamide-vinylsulfonate copolymer. The HSP proppants were coated with the VF-1 polymer as described above. The polymer loading is 0.4% bw (by weight) of the proppant weight. FIG. 1 is a response test graph showing that the pressure differential of the polymer-coated proppant placed inside of a 12-inch long, 1-inch ID stainless steel tube (about 30 cm long by about 2.5 cm ID) changes when pumping with oil (diesel in this Example) relative to pumping with formation water (Simulated Formation Brine or SFB) flowing through the pack. This graph demonstrates that the pack exhibits high flow resistance for water and low flow resistance for oil.

FIG. 2 compares the pressure differentials between the base proppant (not coated—depicted in gray) and the polymer-coated proppant packs (in black, which is the beginning part of FIG. 1). This comparison was also conducted at 200° F. (93° C.) with diesel and simulated formation brine (SFB). The proppants are the same for each type, and the coated proppant was prepared by the method previously described. It may be readily seen that the VF-1 coated proppant was much more effective at controlling water flow than the conventional, non-coated proppant.

More conventionally, RPM polymers are leaked-off into the formation to selectively control water flow, in one non-limiting instance as described by E. G. Borodin, et al. in "Application of Relative Permeability Modifiers to Control Water Cut Following Hydraulic Fracturing in Western Siberian Oil Fields—Russian Case-History Study," SPE 102679, 2006 SPE Annual Technical Conference and Exhibition, San Antonio, Tex., 24-27 Sep. 2006, pp. 411-418. Instead, the compositions and method described herein involve using RPM polymer coated onto proppants in fractures to control water.

In the foregoing specification, the invention has been described with reference to specific embodiments thereof, and has been demonstrated as effective in providing methods for inhibiting and controlling water production from subterranean formations, particularly where the treating fluid includes particles coated with relative permeability modifiers. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of particles, proppants and/or gravels with certain specific RPMs, mixing liquids and carrier fluids and other components falling within the claimed parameters, but not specifically identified or tried in a particular composition or method, are anticipated to be within the scope of this invention. Further, it is expected that the components and proportions of the particles, RPMs and fluids may change somewhat from one fluid to another and still accomplish the stated purposes and goals of the methods described herein.

The words "comprising" and "comprises" as used throughout the claims is interpreted "including but not limited to".

The present invention may suitably comprise, consist or consist essentially of the elements disclosed and may be practiced in the absence of an element not disclosed.

What is claimed is:

1. A method of controlling water production from a subterranean formation comprising:
    introducing particles coated with a relative permeability modifier (RPM) into a subterranean formation through a wellbore, where the RPM is a crosslinked water hydrolyzable polymer having a weight average molecular weight greater than 100,000, and where the particles are selected from the group consisting of glass beads, ceramic beads, metal beads, bauxite grains, walnut shell fragments, aluminum pellets, nylon pellets and combinations thereof; wherein the crosslinked water hydrolyzable polymer is selected from the group consisting of:
        crosslinked polysiloxanes, copolymers of vinylamide monomers and monomers containing ammonium or quaternary ammonium moieties; and
        copolymers of vinylamide monomers and monomers comprising vinylcarboxylic acid monomers and/or vinylsulfonic acid monomers, and salts thereof, and wherein these vinyl amide copolymers comprise a crosslinking monomer selected from the group consisting of diallylamine, N,N-diallylacrylamide, divinyloxyethane, and divinyldimethylsilane; and
    contacting the coated particles with water, causing swelling of the RPM thereby inhibiting water flow.

2. The method of claim 1 further comprising coating the particles with the RPM to form coated particles and mixing the coated particles with a carrier fluid prior to introducing the particles into the subterranean formation.

3. The method of claim 1 where the RPM loading ranges from one pound of RPM per about 100 to about 5000 pounds of particles (1 kilogram of RPM per about 100 to about 5000 kilograms of particles).

4. The method of claim 1 where the particles range in size from about 10 mesh to about 200 mesh (from about 2000 microns to about 75 microns).

5. The method of claim 1 wherein the method further comprises coating the particles with the RPM, wherein coating the particles with the RPM comprises:
    at least partially hydrolyzing the RPM in a liquid selected from the group consisting of water, brine, glycol, ethanol and mixtures thereof;
    contacting the particles with the liquid; and
    at least partially vaporizing the liquid.

6. A method of controlling water production from a subterranean formation comprising:
    introducing particles coated with a relative permeability modifier (RPM) into a subterranean formation through a wellbore where the particles range in size from about 10 mesh to about 200 mesh (from about 2000 microns to about 75 microns), where the RPM loading ranges from one pound of RPM per about 100 to about 5000 pounds of particles (1 kilogram of RPM per about 100 to about 5000 kilograms of particles), where the RPM is a crosslinked water hydrolyzable polymer and where the particles are selected from the group consisting of glass beads, ceramic beads, metal beads, bauxite grains, walnut shell fragments, aluminum pellets, nylon pellets and combinations thereof; wherein the crosslinked water hydrolyzable polymer is selected from the group consisting of:
        crosslinked polysiloxanes; and
        copolymers of vinylamide monomers and monomers containing ammonium or quaternary ammonium moieties, copolymers of vinylamide monomers and monomers comprising vinylcarboxylic acid monomers and/or vinylsulfonic acid monomers, and salts thereof, and wherein these vinyl amide copolymers comprise a crosslinking monomer selected from the group consisting of-diallylamine, N,N-diallylacrylamide, divinyloxyethane, and divinyldimethylsilane; and
    contacting the coated particles with water, causing swelling of the RPM thereby inhibiting water flow;
wherein the method further comprises coating the particles with the RPM, wherein coating the particles with the RPM comprises:
    at least partially hydrolyzing the RPM in a liquid selected from the group consisting of water, brine, glycol, ethanol and mixtures thereof;
    contacting the particles with the liquid; and
    at least partially vaporizing the liquid.

7. The method of claim 6 further comprising mixing the coated particles with a carrier fluid prior to introducing the particles into the subterranean formation.

8. The method of claim 6 where the crosslinked water hydrolyzable polymer has a weight average molecular weight greater than 100,000.

* * * * *